US011994261B1

(12) United States Patent
Lai et al.

(10) Patent No.: US 11,994,261 B1
(45) Date of Patent: May 28, 2024

(54) COLOR-CHANGING LED BULB

(71) Applicant: Fourstar Group Inc., Taipei (TW)

(72) Inventors: Weian Lai, Shenzhen (CN); Benjamin J. Tryde, Pinellas Park, FL (US)

(73) Assignee: Fourstar Group Inc., Taipei (TW)

( * ) Notice: Subject to any disclaimer, the term of this patent is extended or adjusted under 35 U.S.C. 154(b) by 0 days.

(21) Appl. No.: 18/244,503

(22) Filed: Sep. 11, 2023

(51) Int. Cl.
*F21K 9/238* (2016.01)
*F21V 23/00* (2015.01)
*F21Y 113/13* (2016.01)
*F21Y 115/10* (2016.01)
*H05B 47/165* (2020.01)

(52) U.S. Cl.
CPC ............ *F21K 9/238* (2016.08); *F21V 23/002* (2013.01); *F21V 23/005* (2013.01); *H05B 47/165* (2020.01); *F21Y 2113/13* (2016.08); *F21Y 2115/10* (2016.08)

(58) Field of Classification Search
CPC ..... F21K 9/238; H05B 47/165; F21V 23/002; F21V 23/005
See application file for complete search history.

(56) References Cited

U.S. PATENT DOCUMENTS 6,292,901 B1 * 9/2001 Lys ........................ H05B 47/18 713/300
7,667,408 B2 * 2/2010 Melanson .............. H05B 47/10 315/225
8,013,545 B2 * 9/2011 Jonsson .................... F21V 3/02 315/318
8,390,207 B2 * 3/2013 Dowling ................... F21K 9/60 362/240
8,444,299 B2 * 5/2013 Chou ...................... F21K 9/232 362/651
2005/0253533 A1 * 11/2005 Lys ....................... F21V 23/003 315/291
2009/0195186 A1 * 8/2009 Guest ................ H05B 45/3577 313/11

(Continued)

OTHER PUBLICATIONS https://www.amazon.com/Feit-Electric-Color-Changing-Light/dp/B09ZM9KRJ3/ref=sr_1_3?crid=3RBFZV2GD1LG9&keywords=COLOR%2BCHANGING%2BBULB%2Bswitch&qid=1692596339&sprefix=color%2Bchanging%2Bbulb%2B%2Caps%2C282&sr=8-3&th=1 Amazon: Feit Electric LED Color Changing Light Bulb—A19 with an E26 Medium Base Light Bulb—60W Equivalent—15 Year Life.

(Continued)

*Primary Examiner* — Bryon T Gyllstrom
(74) *Attorney, Agent, or Firm* — Salter & Michaelson

(57) ABSTRACT

There is described a color-changing LED bulb in the LED bulb technical field. The bulb has light-emitting components, under which electrified components are mounted. The outer surface of the light-emitting component is covered by a lampshade. The light-emitting component includes a component loading board with a protective cover on the outer side. The power cord stretches out of the bottom of the loading board and is connected to electrified components. Capacitors are also mounted at the bottom of the loading board. This color changing LED bulb controls the power supply to the beads via a chip bridge rectifier, chip resistor, and IC chip. If the switch is flipped, the chip bridge rectifier detects if power is supplied. By connecting the 3 different IC chips—U1, U2 & U3, U1 chip controls the U2 & U3 IC chip to electrify the beads of different colors. Each time that the switch is operated (flipped), a different color is displayed.

15 Claims, 7 Drawing Sheets

(56) References Cited

U.S. PATENT DOCUMENTS

| | | | | |
|---|---|---|---|---|
| 2011/0006680 | A1* | 1/2011 | Tanaka | F21V 23/06 315/35 |
| 2011/0109164 | A1* | 5/2011 | Mohammed Suhura | H02J 9/065 307/66 |
| 2015/0334794 | A1* | 11/2015 | Chou | F21K 9/238 315/291 |
| 2016/0003463 | A1* | 1/2016 | Rodinger | F21K 9/23 362/249.02 |
| 2016/0037598 | A1* | 2/2016 | Ramaiah | H05B 45/375 362/373 |
| 2016/0088693 | A1* | 3/2016 | Zhao | H05B 45/375 315/51 |
| 2017/0164438 | A1* | 6/2017 | Arulandu | F21K 9/238 |

OTHER PUBLICATIONS https://www.amazon.com/GE-Lighting-93129136-Replacement-Changing/dp/B07WC324HZ/ref=sr_1_2?crid=1l7QKIVPVJRJ2&keywords=GE%2BCOLOR%2BCHANGING%2BBULB%2Bwith%2Bremote&qid=1692598017&sprefix=ge%2Bcolor%2Bchanging%2Bbulb%2Bwith%2Bremote%2Caps%2C486&sr=8-2&th=1 Amazon: GE LED+ Color Changing LED Light Bulb with Remote, Multicolor, A19 Standard, No App or Wi-Fi Required.

* cited by examiner

COLOR-CHANGING LED BULB

FIELD OF THE INVENTION

The present invention relates in general to a color-changing LED bulb; and pertains more particularly to a color-changing bulb that has an improved mode of operation. Even more particularly, the present invention relates to a color-changing LED bulb wherein the changing of color is initiated by mean of a mechanically operated control switch that is used to remotely activate a predetermined sequence of color change.

BACKGROUND OF THE INVENTION

LED lighting is an electroluminescent semiconductor chip that is fixed onto a bracket using a silver gel or white gum and is connected to the chip and a circuit board with gold or silver wire. The surroundings (cap) are sealed with an epoxy resin so as to protect the core wiring inside. This may include a casing that is assembled in a final step to ensure the shock resistance of the LED light or bulb.

Most of the existing LED lights are designed with monochromatic sources or alternating polychromatic sources and the light color cannot change by direct switch control. In accordance with the present invention, to enhance the lighting color of LED light, there is proposed a type of color-changing LED bulb that enables the alteration of illumination colors using a switch that is external to the LED bulb.

Accordingly, it is an object of the present invention to provide a color-changing LED bulb in order to solve the technical problem mentioned in the background above.

Another object of the present invention is to provide a color-changing LED bulb that enables the alteration of illumination colors using a switch that is external to the LED bulb.

SUMMARY OF THE INVENTION

To solve the aforementioned technical problem, the present invention presents the following technical solution: The present invention pertains to a color-changing LED bulb in the LED bulb technical field. The bulb has light-emitting components, under which electrified components are mounted. The outer surface of the light-emitting component is covered by a lampshade. The light-emitting component includes a component loading board with a protective cover on the outer side. A power cord stretches out of the bottom of the loading board and is connected to the electrified components. A pair of capacitors are also mounted at the bottom of the loading board.

The control circuitry includes a chip bridge rectifier, chip resistor or resistors, an IC chip, and several beads of different colors which are mounted at the top of the component loading board. The chip bridge rectifier is connected in the circuit in parallel, and the chip resistor is connected in the circuit in series form. The IC chip is positioned at the end of the current flow. Furthermore, the IC chip controls the light emission of the bead.

Preferably, the power cord includes a neutral line and a live line. A fuse resistor is mounted on the live line. Preferably, the live line connects different angles of IC chip in two ways. One earthing line is introduced from the IC chip. Preferably, one live line is connected to the chip bridge rectifier and a chip resistor or resistors. Both capacitors are connected to this branch of the live line. Preferably, the other live line is connected to a diode and the chip resistor. The aforesaid diode and chip resistor are connected to the IC chip in series form. Preferably, the live line and neutral line diagonally connect to the chip bridge rectifier. Parallel lines are led out of the chip rectifier bridge to connect the live line in order to form a new current channel.

Compared with existing technologies, the utility model patent could yield the following benefits. The present invention controls the power supply to the beads via the chip bridge rectifier, chip resistor, and IC chip on the component loading board.

If the switch is flipped, chip bridge rectifier 106 detects whether the live line input is energized or not. If energized, the current will pass through the F1 insurance resistor, D1 diode, R10 chip resistor, and to the pin-4 of U1 chip. And through pin 2, 5, 6 & pin 7 of U1 chip, the current is then passed to U2 & U3 chip. The main function of U1 chip is to detect the number of times that the switch is turned off and on. With cooperation of U2 and U3 chips, the LED beads can realize the change of light colors and color changing mode.

By connecting the IC chip of U1, U2 and U3, the IC chips controls the beads so as to electrify the beads of different colors in order to adjust the color of the LED lights through a switch. The switch is considered as remote from the LED bulb and can be either a wall switch that can be flipped on and off or a socket with a switch and in which the LED bulb is mounted.

In accordance with one version of the present invention there is provided a color-changing LED bulb that comprises a light emitting component, an electrified component that is mounted below the light-emitting component, a lamp shade that covers the light-emitting component, a component loading board having a power cord extending from the loading board and connected to the electrified component. The electrified component including electrified lines, a rectifier, at least one chip resistor and an IC chip, along with multiple light beads of different colors.

In accordance with further aspects of the present invention, the input lines include an input line and a live line; including a fuse resistor mounted on the input line; having the live line connect to the IC chip either via the chip bridge rectifier or via the chip resistor; wherein at the bottom of the component loading board there is disposed a first capacitor and a second capacitor; wherein both the first and second capacitors are connected from the live line; wherein the diode and chip resistor are connected to the IC chip in a series circuit; and wherein the live line and the neutral line diagonally connect to the bridge chip rectifier.

In accordance with the present invention, there is also provided a color-changing LED bulb that comprises an electrical control circuit at the base of the bulb, a base over the control circuit, a lampshade that covers the light-emitting component, a plurality of light beads, and an external switch for controlling a light output from the bulb. The electrical control circuit includes a detection block for detecting the turning on of the switch and a lighting control block for controlling the light beads. The light control block includes a memory circuit and/or a counter for recording the number of times that the switch is operated. In one mode according to the present invention, it is operated so that, after a predetermined number of switch actions, the lighting control block causes an automatic sequential lighting of all of the beads at a predetermined time interval.

In accordance with other aspects of the present invention, the lighting control block controls a predetermined bead to be repeated when the time interval is greater than a predetermined number; the predetermined number may be 5 seconds; the lighting control block control the sequential intervals on the order of 2 second intervals; and wherein the detection blocks including input lines; a chip bridge rectifier; a chip resistor; an IC chip and multiple light beads of different colors.

In accordance with still another version of the present invention, there is provided a method of controlling a color-changing LED bulb that comprises an electrical control circuit and a lighting component that is mounted over the electrical control circuit. Light beads are controlled as to their function to enable a light display of different colors. The method comprises, operating the bulb from a light switch that is external to the bulb and activate in sequence different color light beads based on activation of the switch.

In accordance with a further aspect of the present invention, the switch may be either a wall mounted switch, a switch on a socket of the bulb, or any other externally mounted switch that is not directly on the bulb itself. Wherein, when the switch is operated for a predetermined time between activations the same light color is displayed; wherein, when the switch is operated for at least 5 seconds the same color is displayed; and wherein the lights are controlled automatically with a predetermine interval between each color illumination.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

The technical solution in the implementation of the present invention is described clearly and comprehensively based on the diagrams and the related descriptions, in the example.

Figure 1:
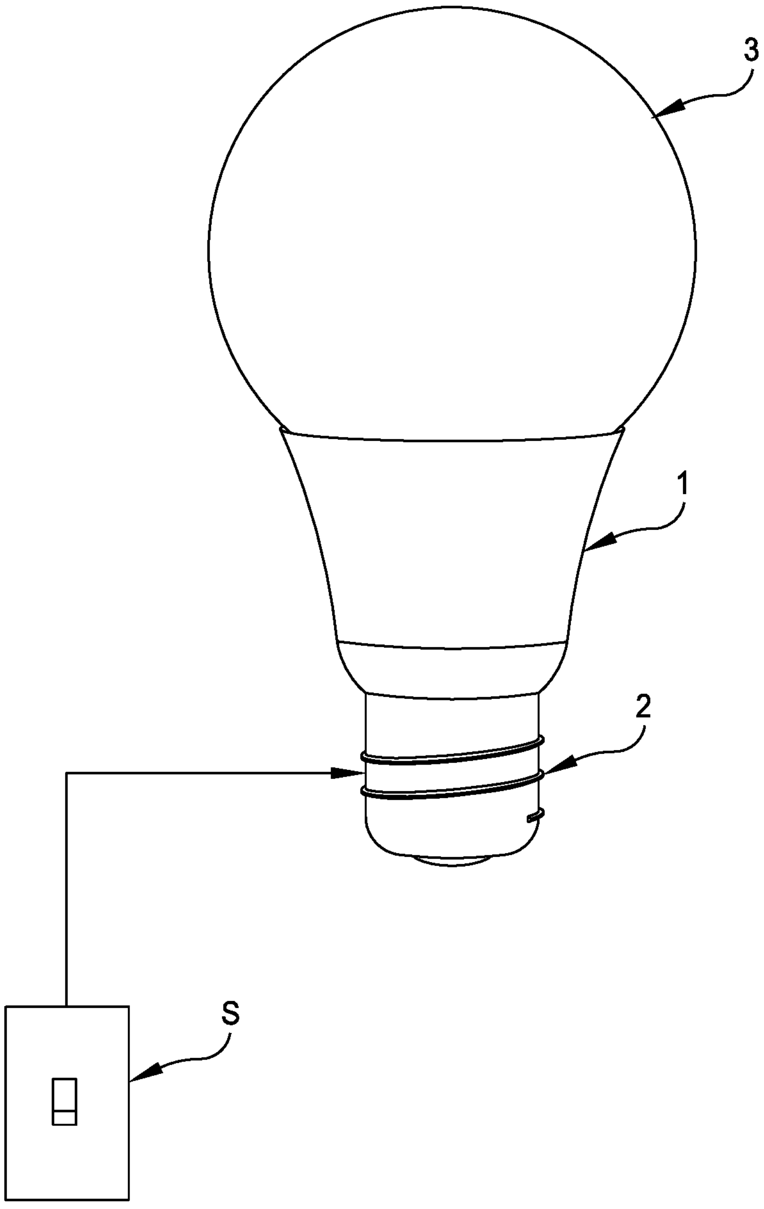
FIG. 1 is a perspective illustration of an LED light bulb of the present invention, and also illustrating a wall switch for activation thereof.
Figure 2:
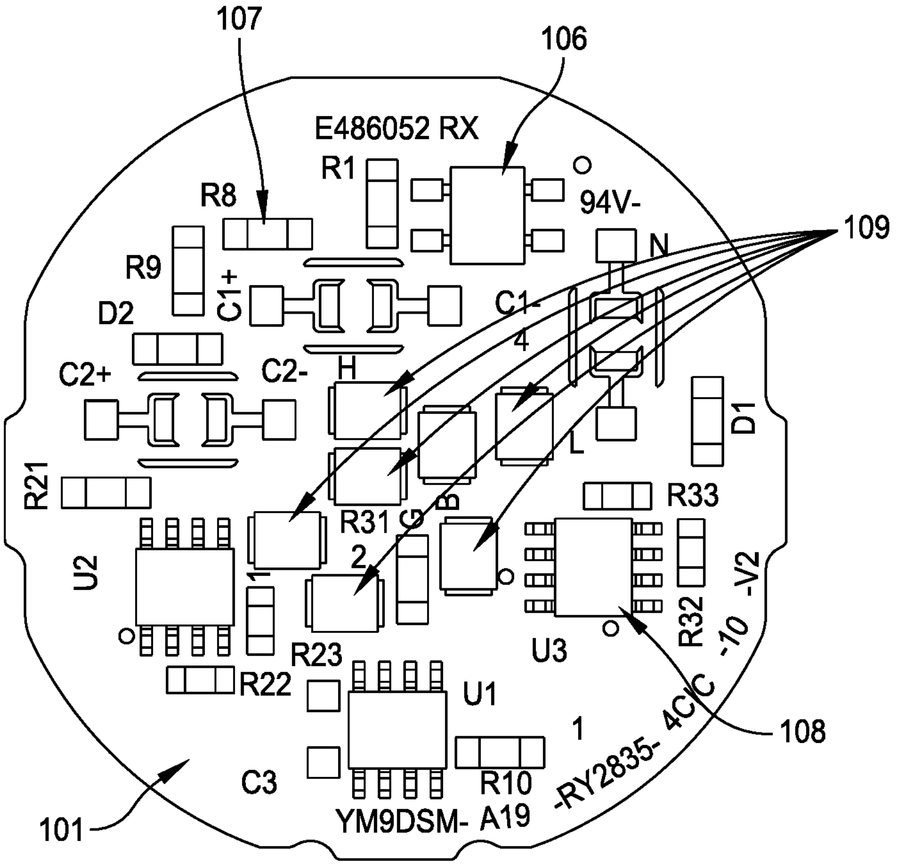
FIG. 2 is a structural diagram of the component layout on the circuit board.

Reference is now made to FIGS. 1-8. A type of color-changing LED bulb comprises a light-emitting part 1, under which electrified components 2 are mounted. The electrified component is used for connecting the lamp head to supply power to the bulb. A lampshade 3 is fitted to the outer surface of the light-emitting component 1 to protect it. In addition to the external parts of the light-emitting part 1 there is provided a loading board that is comprised of several components. Refer to FIG. 2 which illustrates the loading board at 101. FIG. 2 also shows several components that are mounted to the loading board 101. FIG. 2 is a structural diagram of the component layout on the circuit board.

Figure 3:
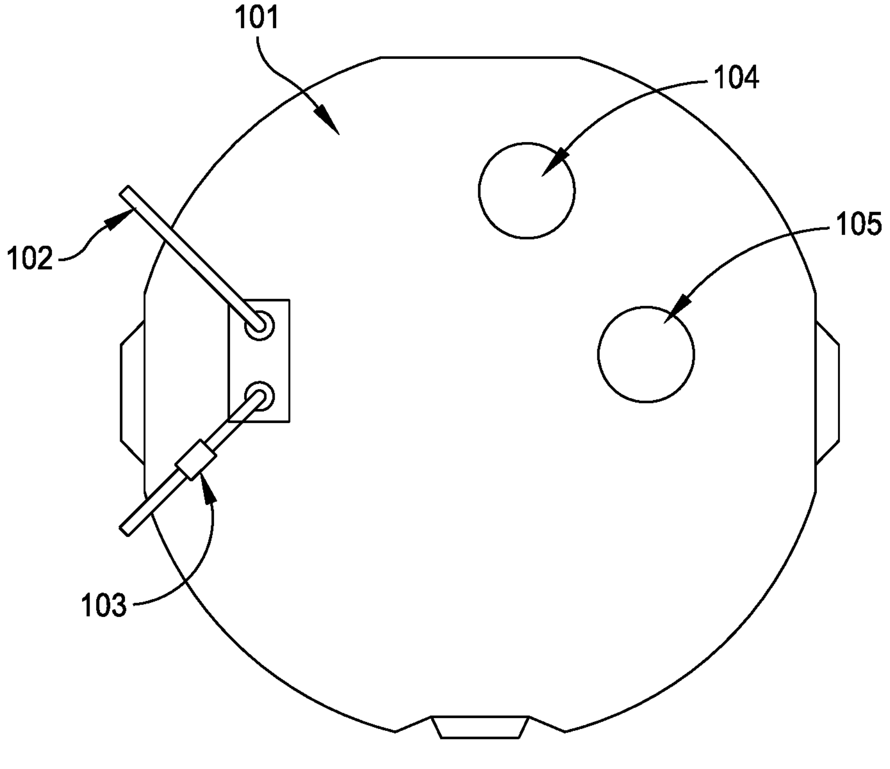
FIG. 3 is a structural diagram of a rear part of circuit board.

Reference is now also made to FIG. 3 is a structural diagram of a rear part of circuit board. The power cord 102 stretches out of the bottom of the loading board 101 and is connected to the electrified component 2. Capacitors 104 and 105 are illustrated in FIG. 3 as mounted at the bottom of the loading board 101.

Figure 4:
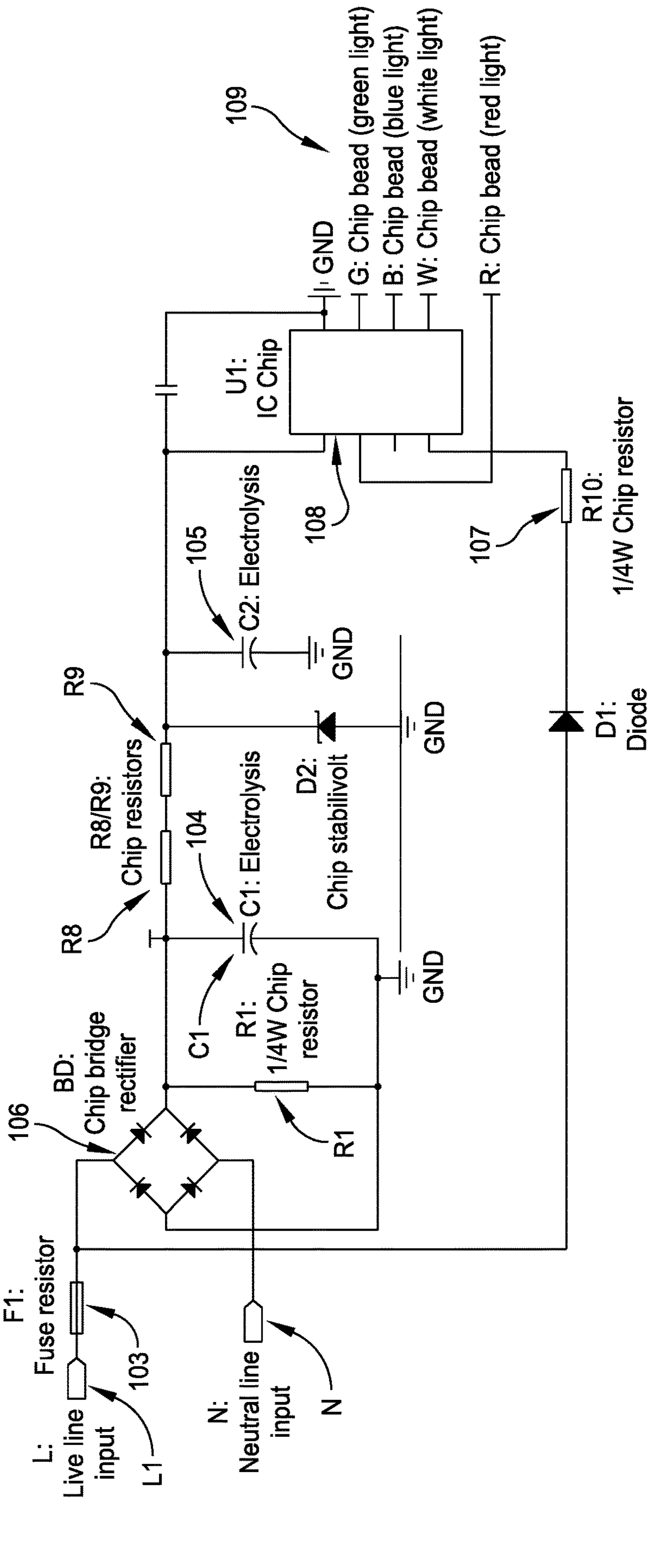
FIG. 4 is a circuit diagram of the main structure control in accordance with the present invention.

Reference is now made to FIGS. 2 and 4 wherein FIG. 2 is a structural diagram of the component layout on the circuit board, and FIG. 4 is a circuit diagram of the main structure control in accordance with the present invention. This circuit layout includes the chip bridge rectifier 106, chip resistor 107, IC chip 108, and several beads of different colors 109. These components are illustrated as being mounted at the top of the component loading board 101. The chip bridge rectifier 106 is connected in a parallel circuit relative to the input lines. The chip resistor 107 is connected in a series circuit with the chip bridge rectifier 106. With regard to FIG. 4 the IC chip 108 is positioned at the end of the current flow. Furthermore, IC chip 108 controls the light emission of the beads 109.

According to the above-mentioned technical solution, the power supply to the beads 109 is controlled via the chip bridge rectifier 106, chip resistor 107, and IC chip 108 on the loading board of parts and components 101. When operating or flipping the switch S, t chip bridge rectifier 106 detects whether the live line input is energized or not. If energized, the current will pass through the F1 insurance resistor, D1 diode, R10 chip resistor, and to the pin-4 of U1 chip. And through pin 2, 5, 6 & pin 7 of U1 chip, the current is then passed to U2 & U3 chip. The main function of U1 chip is to detect the number of times that the switch is turned off and on. With cooperation of U2 and U3 chips, the LED beads can realize the change of light colors and color changing mode.

Reference is now made to FIG. 3 and the circuit diagram of FIG. 4. Specifically, the power cord 102 includes a neutral line N and a live line L. On the live line 1, fuse resistor 103 is mounted. According to the technical solution above, fuse resistor 103 is mounted to the live line L to enhance its safety during usage. Specifically, the live line L connects different modes of the IC chip 108 in two ways. One earthing line L is coupled directly to IC chip 108 by way of the chip resistor 107 which is in series with a diode.

According to the aforementioned technical solution, two live lines are set above. Current is divided by the chip bridge rectifier 106 and connected to the IC chip 108, respectively. During the use process, the circuit controlled by the chip bridge rectifier 106 can be sent to different live lines via an adjusting switch, thereby enabling the IC chip 108 to control light beads 109 of various colors. One line from the chip bridge rectifier 106 is coupled to input terminal 1 of the IC chip 108. Another line couples directly to terminal 4 of the IC chip 108. Refer to FIG. 4. In other words, the live line L is connected to the chip bridge rectifier 106 as well as through the chip resistor 107 to the IC chip identified as chip U1. Both capacitor 1 (104) and capacitor 2 (105) are connected, via the chip bridge rectifier 106, from the live line L to the IC chip 108.

According to the aforementioned technical solution, capacitor 1 (104) and capacitor 2 (105) are set up on the live line to protect the circuit, eliminate potential differences when no power is supplied, and avoid high-frequency voltage upon power supply. In other words, the live line L is connected to the diode and chip resistor 107. The aforesaid diode and chip resistor 107 are connected to the IC chip 108 in a series circuit. The aforesaid diode and chip resistor 107 are used for ensuring current stability and protecting the IC chip 108 and bead 109.

The live line L and neutral line N are diagonally connected to the chip bridge rectifier 106. The parallel outlet lines from the chip rectifier bridge 106 connect the live line L to the IC chip 108 and function in order to form a new current channel. According to the aforementioned technical solution, a live line loop is set on chip bridge rectifier 106 so that current can enter the IC chip 108 when the chip bridge rectifier 106 detects power supply so as to supply power to different beads 109.

During use, the power supply for beads 109 is controlled via the chip bridge rectifier 106, chip resistor 107, and IC chip 108 on the component loading board 101. If the switch is flipped, the chip bridge rectifier 106 detects whether the live line input is energized or not. If energized, the current will pass through the F1 insurance resistor, D1 diode, R10 chip resistor, and to the pin-4 of U1 chip (IC chip 108). And through pin 2, 5, 6 & pin 7 of U1 chip, the current is then passed to U2 & U3 chip.

By connecting the U1 chip (IC chip 108) with U2 & U3 chip, it controls the IC chip 108 to electrify the beads of various colors 109. This achieves the effect of changing the color of LED lights through the switch.

Figure 5:
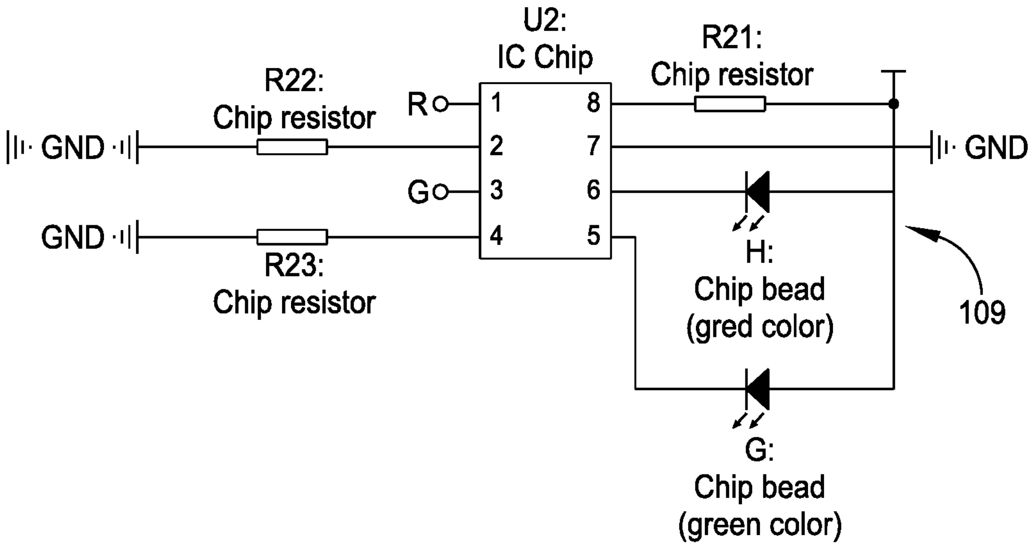
FIG. 5 is a circuit diagram of the "red" and "green" light sources controlled from a second IC chip.
Figure 6:
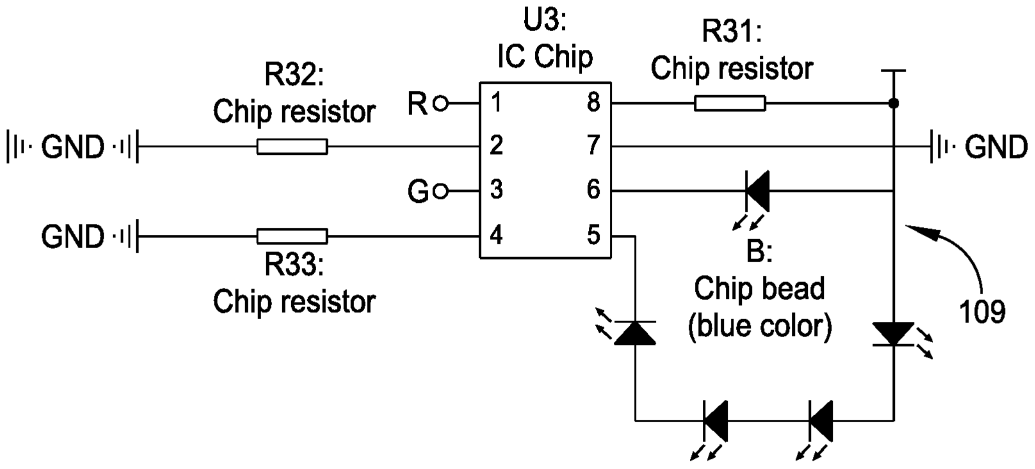
FIG. 6 is a circuit diagram of the "blue" and "white" light sources controlled from a third IC chip.
Figure 8:
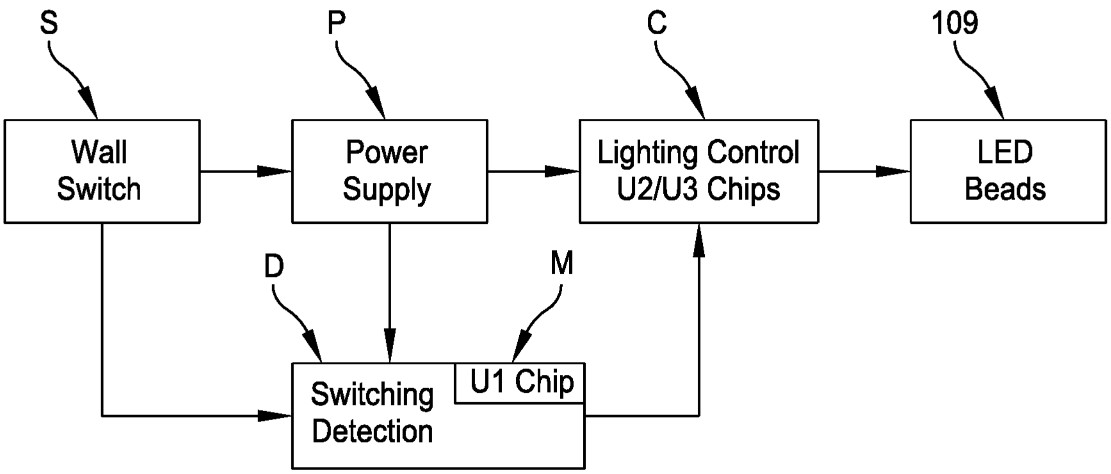
FIG. 8 is a block diagram that is helpful in explaining the operation of the LED bulb of the present invention.

With regard to FIGS. 4-6, reference is now made to the block diagram of FIG. 8 which depicts the various components that are constructed and arranged so as to provide a unique lighting sequence. The block diagram of FIG. 8 illustrates the wall switch as "S" and, connected from the switch, the power supply P. The power supply P, in turn connects to the lighting control block C.

For the purpose of coordinating between FIGS. 3-5 and FIG. 8, the lighting control block C contains the chips U2 and U3 per FIGS. 5 and 6. In the block diagram of FIG. 8 the beads are shown at 109. FIG. 8 also illustrates the switching detection block D. For coordination with FIGS. 3-6, this contains the IC chip U1. Also depicted in FIG. 8 is a block M that represents a memory or counter that is useful in controlling the actions. In FIG. 8 the output from the switch S connects to the power supply P, and the output from the power supply couples to the lighting control block C.

The input (L & N) in FIG. 4 connect to the bridge terminals 1 and 3. Refer to "L" (live wire) & "N" (neutral wire). The "R" parts are all chip resistors. Chip resistors include R21, R31, R32, R22, R23, R33, R1, R10, R8 & R9. Chip resistors—R8 & R9 are more significant. If no R8 & R9, the entire power supply will become unstable. The power supply part of the bulb consists of BD (bridge rectifier 106), R1+R8+R9 (chip resistor), C1(Electrolyzer), D2(Chip Stabilivolt), and C2 (SMD terminal). These parts make up the power supply section that powers the U1, U2 & U3 chips.

When the wall switch is "on", the current passes through the F1 insurance resistor, all the way to the R10 chip resistor, through the U1 chip. The first time of "switch on" current gives a signal to the U1 chip. The U1 chip records and detects the number of switching times (memory M), and thus outputs signals to the U2 chip and the U3 chip. According to the signals provided by the U1 chip, the U2 chip and the U3 chip transforms the signal of color ratio to the lamp beads, which emits different light colors.

Thus, in accordance with one mode of operation, the light switch, each time that it is activated, through the switching detection block D, causes a change in the color at the lightbulb. For example, if the operator flips the switch S at say every 2-3 second intervals, then in sequence the color at the light bulb will change from one color to the next.

In accordance with another mode of operation, a counter counts the number of actuations. In one example, there may be 16 different colors such as red, pink, magenta, light magenta, orange, light orange, green, light green, yellow, light yellow, light blue, violet, light purple, blue, aqua, bright white displayed by the LED bulb. After the operator has sequenced through all 16 colors, by virtue of the counter, this causes an automatic sequential display of all colors without any further switch activation. This may thus proceed in sequence to change colors from one to the next without any further switch activation. Once the switch is flipped the 17th time that initiates an automatic sequencing through all colors at, for example, 2 second intervals. The memory and any counter circuit keeps track of the switch flips to transition to the automatic sequence where all colors are displayed at a predetermined interval.

In accordance with another feature of the present invention, the counter and memory can determine the interval between switch activations. In one example, if the switch is off for more than say 5 seconds, this is interpreted by the circuitry so that same color is displayed and there is no color change. Thus, if there is at least a 5 second interval between switch activations, the next time that the switch is operated, the same color will be displayed.

The IC chip is to be programmed for these different time sequences. The U1 chip is actually the "memory" part, which is to be programmed to control the sequences and modes. The "switch" that is referred to may be a wall light switch or the switch that comes with the fixture where the bulb is mounted. In accordance with the present invention, the bulbs are controlled by a circuit to achieve on/off as well as color change. Changing the switch from off to on, electricity goes through live wire input, and current passes through F1 (fuse resistor), D1 (diode), R10 (chip resistor) and through pin-4 of the U1 chip, then pin-2, pin-5, pin-6, pin-7 and finally outputs signals to the U2 chip and U3 chip. See the connecting terminals G, B, W and R in FIGS. 3-5. The signals G and R con net to the IC chip U2 and the signal B and W connect to the IC chip U3.

Figure 7:
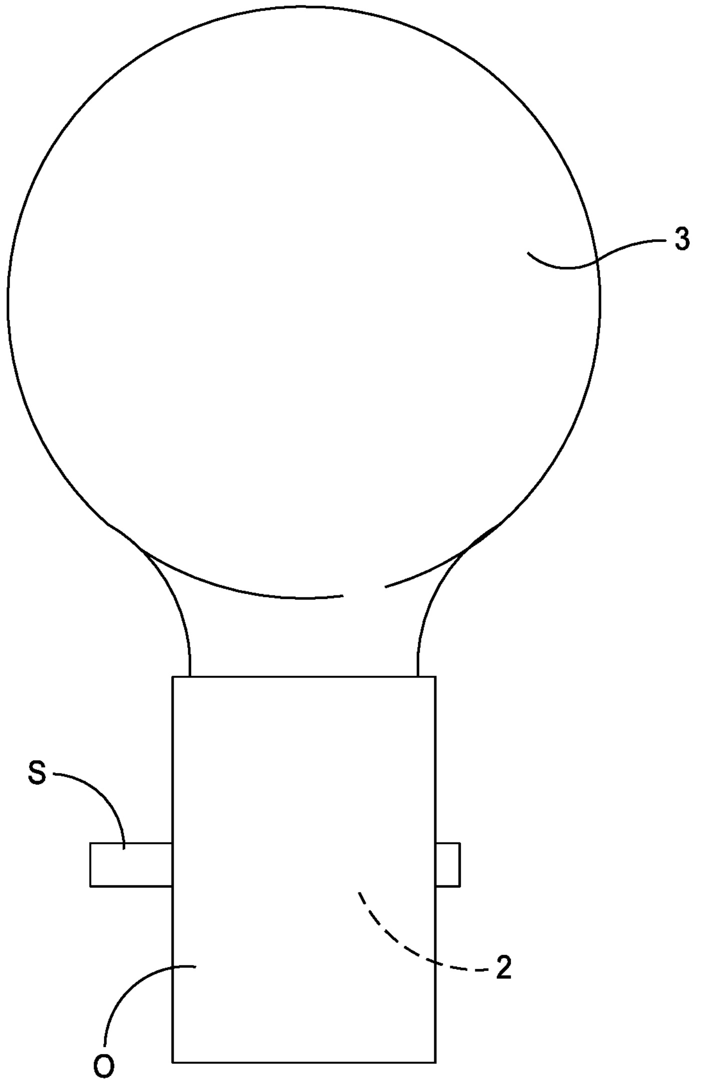
FIG. 7 is a perspective view of an alternate switch arrangement including a support socket.

Reference is now also made to FIG. 7 which is a schematic diagram illustrating the case where rather than s wall switch there is a switch S directly on the socket bowl O. The same type bulb can be used in FIG. 7 as previously described in connection with FIG. 1 and thus including the light emitting components and electrified components along with the lamp shade.

| List of Reference Numbers | |
|---|---|
| LED bulb | B |
| neutral line | N |
| live line | L |
| power supply | P |
| lighting control block | C |
| switching detection block | D |
| light emitting component | 1 |
| electrified component | 2 |
| lampshade | 3 |
| component loading board | 101 |
| power cord | 102 |
| fuse resistor | 103 |
| capacitor | 104 |
| capacitor | 105 |
| chip bridge rectifier | 106 |
| chip resistor | 107 |
| IC chip | 108 |
| beads | 109 |

-continued

| List of Reference Numbers | |
|---|---|
| switch detection chip | U1 |
| lighting control chips | U2, U3 |

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A color-changing LED bulb that comprises a light-emitting component, electrified components that are mounted below the light-emitting component, a lampshade that covers the light-emitting component, a component loading board having a power cord extending from the loading board, connected to the electrified components and including input lines, a chip bridge rectifier, a chip resistor, an IC chip and multiple light beads of different colors mounted at the top of the component loading board, the chip bridge rectifier being connected in parallel with the input lines, the chip resistor is connected in a series circuit with the chip bridge rectifier, the IC chip controlling light emission of the bead, a switch for controlling a light output from the bulb and capable of being turned on and off, a detection block for detecting the turning on of the switch; and a lighting control block for controlling the light beads, the lighting control block including a memory circuit for counting a number of times that the switch is operated so that, if there is at least a predetermined interval between switch activations, the next time that the switch is operated, the same color is displayed.

2. A color-changing LED bulb according to claim 1 wherein the input lines include a neutral line and live line.

3. A color-changing LED bulb according to claim 2 including, mounted on the input line, a fuse resistor.

4. A color-changing LED bulb according to claim 2 wherein the live line connects to the IC chip either via the chip bridge rectifier, or via the chip resistor.

5. A color-changing LED bulb according to claim 4 wherein at the bottom of the component loading board are disposed a first capacitor and a second capacitor.

6. A color-changing LED bulb according to claim 5 wherein both the first and second capacitors are connected from the live line.

7. A color-changing LED bulb according to claim 3 wherein the diode and chip resistor are connected to the IC chip in a series circuit.

8. A color-changing LED bulb according to claim 2 wherein the live line and neutral line diagonally connect to the chip bridge rectifier.

9. A color-changing LED bulb that comprises:

an electrical control circuit at a base of the bulb;

a light-emitting component that is mounted over the electrical control circuit;

a lampshade that covers the light-emitting component;

light beads; and an external switch for controlling a light output from the bulb and capable of being turned on and off;

the electrical control circuit including a detection block for detecting the turning on of the switch; and a lighting control block for controlling the light beads;

the lighting control block including a memory circuit for counting a number of times that the switch is operated so that after a predetermined number of switch actions, the lighting control block causes a sequential lighting of the beads at a predetermined time interval.

10. A color-changing LED bulb according to claim 9 wherein the lighting control block includes a memory for counting switch activations in order to determine the predetermined number.

11. A color-changing LED bulb according to claim 10 wherein the lighting control block senses the time interval between switch activations, and wherein multiple colors include red, pink, magenta, light magenta, orange, light orange, green, light green, yellow, light yellow, light blue, violet, light purple, blue, aqua, bright white.

12. A color-changing LED bulb according to claim 11 wherein the lighting control block controls a predetermined bead/light to be repeated when the time interval is greater than a predetermined number.

13. A color-changing LED bulb according to claim 12 wherein the predetermined number is 5 seconds.

14. A color-changing LED bulb according to claim 10 wherein the lighting control block controls the sequential interval at on the order of 2 seconds.

15. A color-changing LED bulb according to claim 9 wherein the detection block includes input lines, a chip bridge rectifier, a chip resistor, an IC chip and multiple light beads of different colors.

* * * * *